United States Patent
Debata et al.

(10) Patent No.: US 10,860,383 B2
(45) Date of Patent: Dec. 8, 2020

(54) MULTIPLE CONSOLE ENVIRONMENT

(71) Applicant: Dell Products L.P., Round Rock, TX (US)

(72) Inventors: Smruti Ranjan Debata, Bangalore (IN); K. N. Ravishankar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 118 days.

(21) Appl. No.: 16/121,807

(22) Filed: Sep. 5, 2018

(65) Prior Publication Data
US 2020/0073720 A1    Mar. 5, 2020

(51) Int. Cl.
*G06F 9/50*    (2006.01)
*H04L 12/24*    (2006.01)
*H04L 12/26*    (2006.01)

(52) U.S. Cl.
CPC .......... *G06F 9/5038* (2013.01); *H04L 41/044* (2013.01); *H04L 43/08* (2013.01)

(58) Field of Classification Search
CPC .................................................... G06F 9/5038
See application file for complete search history.

(56) References Cited

U.S. PATENT DOCUMENTS

| | | | |
|---|---|---|---|
| 2009/0106571 A1* | 4/2009 | Low ...................... | G06F 9/4856 713/310 |
| 2011/0082902 A1* | 4/2011 | Rottler .................. | H04L 65/602 709/204 |
| 2013/0198829 A1* | 8/2013 | Bund .................... | H04L 63/029 726/11 |
| 2018/0096174 A1* | 4/2018 | Finger .................... | G06F 21/88 |
| 2018/0246790 A1* | 8/2018 | Sankaranarayanan ....................... G06F 11/2017 |
| 2019/0187909 A1* | 6/2019 | Pinto ..................... | G06F 3/0605 |

* cited by examiner

*Primary Examiner* — Sisley N Kim
(74) *Attorney, Agent, or Firm* — Jackson Walker L.L.P.

(57) ABSTRACT

A management controller of an information handling system may be configured to provide out-of-band management of the information handling system by receiving a first instruction from a first management console, the first instruction relating to a particular feature. The management controller may further be configured to receive a second instruction from a second management console, the second instruction also relating to the particular feature. In response to a determination that the first management console has a higher priority than the second management console, the management controller may execute the first instruction but not the second instruction.

20 Claims, 2 Drawing Sheets

MULTIPLE CONSOLE ENVIRONMENT

TECHNICAL FIELD

The present disclosure relates in general to information handling systems, and more particularly to systems and methods for management of information handling systems from a plurality of management consoles.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As described in further detail below, management controllers may be used to provide management facilities for information handling systems. An administrator may interface and provide instructions to such a management controller via the use of one or more management consoles, such that the management controller may execute the administrator's instructions to manage a target information handling system. For purposes of this disclosure, the terms "target information handling system," "managed node," "managed target," "target device," etc. may be used interchangeably.

An issue may arise when more than one management console (typically but not necessarily operated by more than one administrator) attempts to provide instructions to a single management controller. Instructions may be received at the management controller via multiple consoles, or from external sources, programs, or scripts. Thus a particular one of the multiple management consoles may not receive information about changes made or operations (e.g., variable setting operations) performed from other management consoles on the target information handling system via the management controller. This may cause various difficulties.

For example, the failure of consoles to synchronize their state with respect to their managed node may lead to reapplying or overwriting either the same or different configuration change sets for a given time period. This may cause ambiguity and may also result in undesirable behavior for the system under management. Further, configuration changes that are followed by a system reset/reboot may cause inconvenience to other consoles and/or a lag in management data for that time period for the managed node during such a system reset.

Accordingly, it would be desirable to be able to rank the priority of management consoles, such that low-priority consoles could not interfere with the operation of high-priority consoles. According to some embodiments, the systems and methods described herein may provide such functionality.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with management of information handling systems may be reduced or eliminated.

In accordance with embodiments of the present disclosure, an information handling system may include a processor, a memory coupled to the processor, and a management controller configured to provide out-of-band management of the information handling system. Such out-of-band management may be provided by receiving a first instruction from a first management console, the first instruction relating to a particular feature; receiving a second instruction from a second management console, the second instruction relating to the particular feature; and in response to a determination that the first management console has a higher priority than the second management console, executing the first instruction but not the second instruction.

In accordance with these and other embodiments of the present disclosure, a method may include a management controller receiving a first instruction from a first management console, the first instruction relating to a particular feature of an information handling system, wherein the management controller is configured to provide out-of-band management of the information handling system. Such method may further include the management controller receiving a second instruction from a second management console, the second instruction relating to the particular feature. Such method may still further include in response to a determination that the first management console has a higher priority than the second management console, the management controller executing the first instruction but not the second instruction.

In accordance with these and other embodiments of the present disclosure, an article of manufacture may include a non-transitory, computer-readable medium having instructions thereon that are executable by a processor of a management controller of an information handling system for: receiving a first instruction from a first management console, the first instruction relating to a particular feature; receiving a second instruction from a second management console, the second instruction relating to the particular feature; and in response to a determination that the first management console has a higher priority than the second management console, executing the first instruction but not the second instruction.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
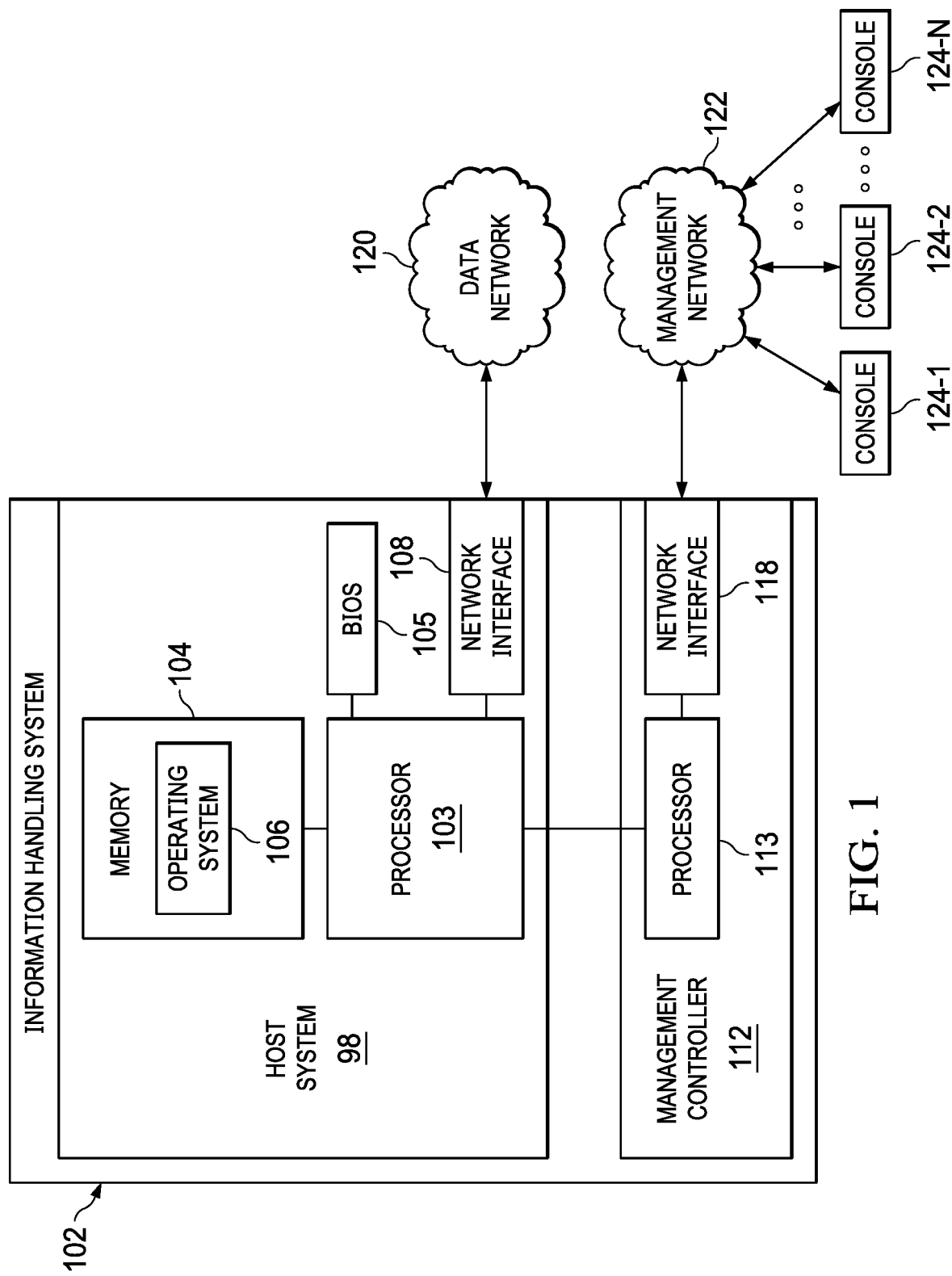
FIG. 1 illustrates a block diagram of an example information handling system, in accordance with embodiments of the present disclosure.
Figure 2:
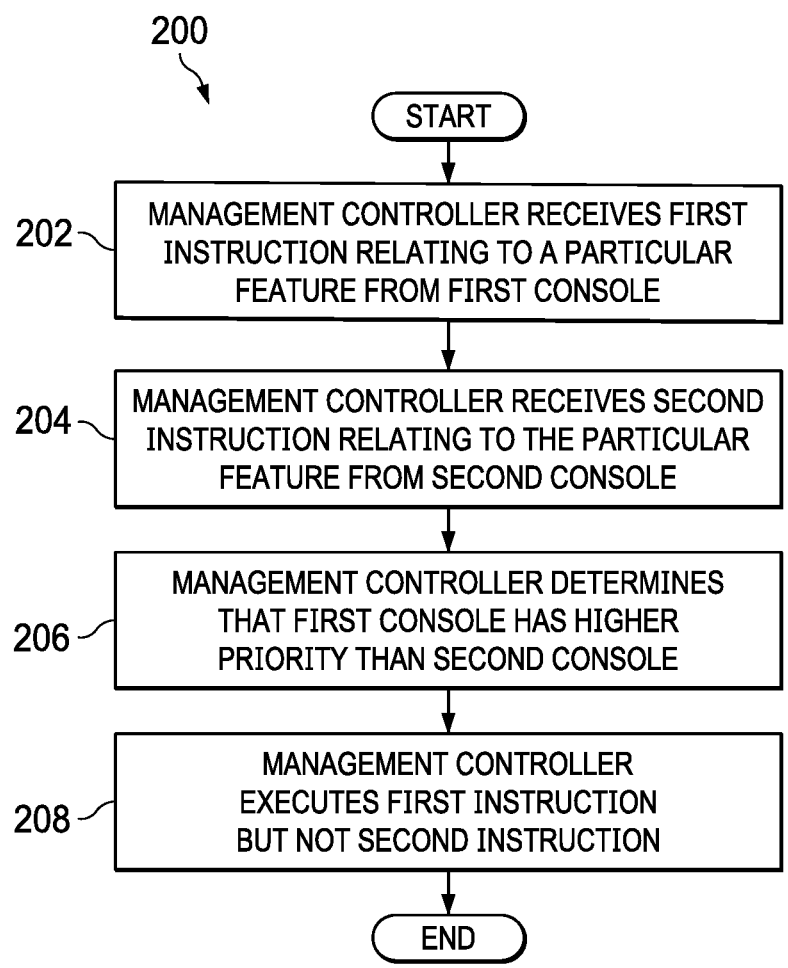
FIG. 2 illustrates a flow chart of an example method, in accordance with embodiments of the present disclosure.

Preferred embodiments and their advantages are best understood by reference to FIGS. 1 through 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a baseboard management controller (BMC), a chassis management controller (CMC), or a remote access controller (e.g., a Dell Remote Access Controller or Integrated Dell Remote Access Controller).

For the purposes of this disclosure, the terms "console" and "management console" may be used interchangeably to refer broadly to systems that are configured to couple to a management controller and issue management instructions for an information handling system that is being managed by the management controller. One example of such a console is the Dell OpenManage Essentials systems management console. In various embodiments, management consoles may be implemented via specialized hardware and/or via software running on a standard information handling system. In some embodiments, a management controller and a management console may be in a 1:1 relationship, such that each console is used to instruct exactly one management controller. In other embodiments, a 1:N arrangement may be used in which there is no such 1:1 correspondence, such that multiple consoles may be used to instruct a single management controller.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over data network 120). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a management network interface 118 separate from and physically isolated from data network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to management network 122, which may be separate from and physically isolated from data network 120. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Consoles 124-1 through 124-N (collectively referred to as consoles 124) may be communicatively coupled to management controller 112 via management network 122. A user or administrator may use any one of consoles 124 to interact with management controller 112. For example, consoles 124 may be used to display data that has been read from management controller 112 regarding the state of information handling system 102. Further, consoles 124 may be used to set values of configuration variables, initiate reboots, install updates, and/or complete any other management task as needed, as will be understood by one of ordinary skill in the art with the benefit of this disclosure.

Consoles 124 may be ranked in terms of their relative priority, for example with numerical rankings in some given range such as 1-5. For example, consoles 124-1 and 124-2 may be assigned a rank of 1, indicating that they are the highest-priority type of console. Console 124-3 may be assigned a rank of 5, indicating that it is the lowest-priority type of console, etc.

Further, the types of operations that may be completed on a managed node may also be classified hierarchically. For example, weighted index values in the range of 1-5 (high values) may be used for the most critical operations, accessible only by high-priority consoles. Weighted index values in the range of 6-10 (low values) may be used for less critical operations, etc.

Particularly critical or disruptive operations may be assigned a weight value indicative of their importance. For example, causing a reboot would have a higher weighted index value than something less important such as setting a device location. As another example, updating a RAID controller configuration might have a higher weighted index value than delete a user account in the managed node. As yet another example, setting an emergency power reduction might have a higher weighted index value than resetting the power and thermal statistics/history.

The hierarchical weight values assigned to different management tasks may then be mapped onto the console ranking values, such that, for example, only high-priority consoles are able to complete certain tasks. For example, a console with a rank of 1 may be able to complete any management task. A console with a rank of 2 may be able to complete some subset of management tasks (e.g., tasks with a weight value greater than some threshold value). A console with a rank of 3 may be able to complete some smaller subset of management tasks (e.g., tasks with a weight value greater than some larger threshold value).

In some embodiments, the managed node may be capable of determining the priority rankings for different consoles via a handshake procedure. For example, a managed node may expose a setConsole( ) API that may be called by a management console to register itself with that managed node. Based on identifying information for the console that is provided to the managed node, the managed node may be able to determine what its priority rank should be.

Some consoles may support a means of broadcasting and publishing their existence, for example, by using standard network protocols such as Link Layer Discovery Protocol (LLDP). For example, publishable meta-attributes like Name, Version, management capabilities, etc. may be published to all of that console's managed nodes (e.g., all of the nodes in the same subnet/network). If any console is not registered with the managed node, it may be advantageous to allow that console by default to execute GET operations but not SET operations.

In some embodiments, it may be desirable for a particular operation to be accessible only from a particular console. This may be referred to as "blacklisting" that operation with respect to that console. Adding the operation to the blacklist with respect to a particular console may prevent all other consoles from being able to access it. A blacklisting example is shown and described below.

An example embodiment is now shown below of a configuration file specifying operations that may be accessed via particular consoles. In the embodiment shown, the configuration file is formatted as XML, but one of ordinary skill in the art with the benefit of this disclosure will appreciate that any suitable format may be used (e.g., JSON, CSV, etc.).

```
<?xml version = "1.0" encoding="UTF-8" standalone="yes"?>
<consoles>
    <console_list max_count ="5" />
    <console id="1" name="Dell OpenManage Enterprise"
        version="1.x">
        <priority value="1" /> <!-- priority for console -->
        <set_operations weight_index_range="1-5"
            privileges="admin, power_users". . ./> <!-- allowed
            SET operations considering weighted index range -->
        <operation_exceptions> <!-- blacklisted operation
            specifications: below SET operations cannot be
            performed from other consoles -->
            <set_method name="resetSystem" />
            <set_method name="setRAIDConfig" />
            . . . . . . . . . . . . . . . .
        </operation_exceptions>
    </console>
    <console id="2" name="Dell OMIVV" version="2.x">
        <priority value="2" />
        <set_operations weight_index_range="6-10"
            privileges="admin, power_users" . . ./>
        <operation_exceptions>
            <set_method name="changeVMConfiguration" />
            . . . . . . . . . . . . . . . . . . . .
        </operation_exceptions>
    </console>
    <console>
        . . . . . . . . . . . . . . . . .
    </console>
</consoles>
```

In this example, the "Dell OpenManage Enterprise" console is shown as having the highest priority rank (rank 1), and the "Dell OMIVV" console is shown as having a lower priority rank (rank 2). The example configuration file specifies what types of operations may be completed by each, as well as blacklisted operations which (as described above) may be completed only from a particular console.

Such a configuration file may be parsed and implemented via any standard techniques that will be understood by one of ordinary skill in the art with the benefit of this disclosure.

In some embodiments, an internal system user (in one example, a user named "sys_node_user") may be created in the managed node to be responsible for running the algorithm that implements the console access rules that are specified in a configuration file. This user may also monitor, track, and/or log all of the set operation, actions, and activities requested for that managed node that would require superuser privileges.

FIG. 2 illustrates a flow chart of an example method 200 for controlling information handling system management, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen. In these and other embodiments, method 200 may be implemented as hardware, firmware, software, applications, functions, libraries, or other instructions.

At step 202, a management controller may receive, from a first console, a first instruction that relates to a particular feature. For example, the feature may be a particular variable of the managed node that the console is attempting to set.

At step 204, the management controller receives, from a second console, a second instruction that also relates to the particular feature. For example, the second instruction may be an instruction that conflicts with the first instruction (e.g., by setting the variable to a different value).

At step 206, the management controller determines that the first console has a higher priority than the second console. This may be accomplished, for example, by parsing a configuration file as described above, or in any suitable way.

At step 208, in response to the determination that the first console has a higher priority than the second console, the management controller executes the first instruction but not the second instruction. For example, because the first console has higher priority, the management controller may set a variable to a value specified by the first console, and may not allow the second console to override that value.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using any of the various components disclosed herein (such as the components of FIG. 1), and/or any other system operable to implement method 200. In certain embodiments, method 200 may be implemented partially or fully in software and/or firmware embodied in computer-readable media.

Various embodiments have been described above. Some of such embodiments may include additional features as well.

For example, in some embodiments a managed node may be configured to remember/persist a list of associated management consoles during power reset/off scenarios. Similarly, a managed node may determine a number of consoles to persist (e.g., a configurable default of 5 management consoles may be remembered)

In some embodiments, a managed node may refrain from overriding any configurations/system settings previously made, and/or send a system alert if one of the console is trying to perform a reset for the same attribute (for example, an attribute which is outside of its range of permissible actions). Thus higher priority consoles may be alerted about the change request and able to act upon it if applicable. Further, in some embodiments, even if the attribute is within the range of permissible actions for the second console, the managed node may refrain from overriding a setting previously made by a higher-priority console.

In some embodiments, a particular managed node may be configured to replicate its pre-constructed and trusted list of management consoles to its neighbor nodes, including any existing priority rankings. This may be accomplished, for example, via standard network protocols such as Discovery/LLDP, etc.

In some embodiments, a managed node may prevent a system reset/reboot for non-synchronized operations that are followed by system power reset. For example, if a particular console instructs the node to set some attribute and then reboot, the managed node may prevent the reboot if there are other outstanding attribute setting operations that have not yet been synchronized.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   a chassis housing information handling system resources, wherein the information handling system resources include:
   a host comprising:
      a processor; and
      a memory coupled to the processor; and
   a management controller configured to:
      identify a plurality of management consoles and determine priority rankings for the plurality of management consoles, wherein each of the plurality of management consoles is configured to issue management instructions to the management controller; and
      provide out-of-band management of the host by:
         receiving a first management instruction from a first management console, the first management instruction relating to a particular feature of the host;
         receiving a second management instruction from a second management console, the second management instruction relating to the particular feature; and
         in response to a determination that the first management console has a higher priority than the second management console, executing the first management instruction but not the second management instruction.

2. The information handling system of claim 1, wherein the management controller is further configured to:
   receive a third management instruction from a third management console, the third management instruction relating to the particular setting; and
   in response to a determination that the third management console has a higher priority than the first management console, execute the third management instruction.

3. The information handling system of claim 1, wherein the first and second management instructions are instructions to set a value of a variable, and wherein the first and second management instructions are in conflict with one another.

4. The information handling system of claim 3, wherein the first management instruction is configured to cause the variable to be set to a particular value, and wherein the management controller is further configured to cause the variable to remain set to the particular value following a reboot of the information handling system.

5. The information handling system of claim 3, wherein the management controller is further configured to parse a configuration file to determine that the first management console has a higher priority than the second management console.

6. The information handling system of claim 5, wherein the management controller is further configured to parse the configuration file to determine a weight value corresponding to the variable.

7. The information handling system of claim 6, wherein the management controller is further configured to determine whether or not the first management console is authorized to access the particular feature prior to executing the first management instruction.

8. The information handling system of claim 1, wherein the management controller is further configured to transmit an alert notification to the first management console regarding the second management instruction.

9. The information handling system of claim 8, wherein the alert notification is a broadcast notification receivable by at least one other management console.

10. A method comprising:
    identifying, by a management controller of an information handling system comprising a chassis enclosing a host system and the management controller, a plurality of management consoles wherein each of the plurality of management consoles is configured to issue management instructions to the management controller for managing the host;
    determining priority rankings for the plurality of management consoles;
    receiving a first management instruction from a first management console, the first management instruction for managing a particular feature of the host;
    receiving, by the management controller, a second management instruction from a second management console, the second management instruction for managing the particular feature; and in response to determining, from the priority rankings that the first management console has a higher priority than the second management console, executing the first management instruction but not the second instruction.

11. The method of claim 10, wherein the first and second management instructions are instructions to set a variable of the information handling system relating to the particular feature.

12. An article of manufacture comprising a non-transitory, computer-readable medium having computer-executable code thereon that is executable, wherein the code, when executed by a processor of a management controller of an information handling system comprising a housing enclosing a system processor, a host system memory, and the management controller for, causing the management controller to perform operations comprising:
   identifying, by the management controller of an information handling system comprising a chassis enclosing a host system and the management controller, a plurality of management consoles wherein each of the plurality of management consoles is configured to issue management instructions to the management controller for managing the host;
   determining priority rankings for the plurality of management consoles;
   receiving a first management instruction from a first management console, the first management instruction relating to for managing a particular feature of the host;
   receiving, by the management controller, a second management instruction from a second management console, the second management instruction relating to for managing the particular feature; and
   in response to a determination determining, from the priority rankings that the first management console has a higher priority than the second management console, executing the first management instruction but not the second management instruction.

13. The article of claim 12, wherein the operations further include:
   receiving a third management instruction from a third management console, the third management instruction relating to the particular setting; and
   in response to a determination that the third management console has a higher priority than the first management console, executing the third management instruction.

14. The article of claim 12, wherein the determination that the first management console has a higher priority than the second management console is made with respect to the particular feature.

15. The article of claim 14, wherein the operations further include managing a second feature, and wherein the first management console does not have a higher priority than the second management console with respect to the second feature.

16. The article of claim 12, wherein the particular feature includes a reset of the information handling system.

17. The article of claim 12, wherein the first and second management instructions are instructions to set a value of a variable.

18. The article of claim 17, wherein the first management instruction is configured to cause the variable to be set to a particular value, and wherein the management controller is further configured to cause the variable to remain set to the particular value following a reboot of the information handling system.

19. The article of claim 17, wherein the operations further include parsing a configuration file to determine that the first management console has a higher priority than the second management console.

20. The article of claim 12, wherein the operations further include transmitting an alert notification to the first management console regarding the second management instruction.

* * * * *